United States Patent
Korus et al.

(10) Patent No.: US 7,075,929 B2
(45) Date of Patent: Jul. 11, 2006

(54) DENSE MODE IP MULTICAST CALL SCOPING IN A WIRELESS COMMUNICATION SYSTEM

(75) Inventors: Michael F Korus, Hoffman Estates, IL (US); Mario F DeRango, Wauconda, IL (US)

(73) Assignee: Motorola, Inc., Schaumburg, IL (US)

( * ) Notice: Subject to any disclaimer, the term of this patent is extended or adjusted under 35 U.S.C. 154(b) by 829 days.

(21) Appl. No.: 09/875,355

(22) Filed: Jun. 6, 2001

(65) Prior Publication Data

US 2002/0191584 A1   Dec. 19, 2002

(51) Int. Cl.
*H04L 12/28* (2006.01)
(52) U.S. Cl. .................... 370/390; 370/328
(58) Field of Classification Search ............... 370/312, 370/313, 328, 338, 351, 390, 401, 432
See application file for complete search history.

(56) References Cited

U.S. PATENT DOCUMENTS

| | | | |
|---|---|---|---|
| 6,240,089 B1 * | 5/2001 | Okanoue et al. ............ 370/390 |
| 6,243,758 B1 * | 6/2001 | Okanoue ..................... 709/238 |
| 6,331,983 B1 * | 12/2001 | Haggerty et al. ........... 370/400 |
| 6,426,945 B1 * | 7/2002 | Sengodan ................... 370/238 |
| 6,477,149 B1 * | 11/2002 | Okanoue ..................... 370/312 |
| 6,611,872 B1 * | 8/2003 | McCanne .................... 709/238 |
| 6,771,593 B1 * | 8/2004 | Popovich .................... 370/218 |

* cited by examiner

*Primary Examiner*—Huy D. Vu
*Assistant Examiner*—Christine Ng
(74) *Attorney, Agent, or Firm*—Steven R. Santema; Indira Saladi (57) ABSTRACT

Methods are disclosed for limiting the scope of flooding of dense mode IP multicast calls. A multicast scope value (e.g., TTL scope or hop limit) is determined for each call based on the locations of participating devices for the call at one or more destination sites, zones or zone clusters. The multicast scope value is adjusted based on user location, as wireless users may roam from site to site or zone to zone (or zone cluster). When a user sources packets for a call, the packets include the multicast scope value. The packets are transported, according to dense mode routing protocols, across various router interfaces of a packet network. The router interfaces are assigned various thresholds based on their location in the network. Packets are not flooded across router interface(s) having thresholds that exceed the packet's multicast scope value. Thus, through judicious choice of multicast scope value, the flooding of packets for a call may be constrained to within a single zone (or zone cluster), or allowed to proceed to remote zones.

13 Claims, 7 Drawing Sheets

FIG.4 EXAMPLE: TTL SET TO 7

FIG.5

EXAMPLE: TTL SET TO 12

DENSE MODE IP MULTICAST CALL SCOPING IN A WIRELESS COMMUNICATION SYSTEM

FIELD OF THE INVENTION

This invention relates generally to communication systems, and particularly wireless communication systems incorporating Dense Mode Internet Protocol (IP) multicast routing protocols.

BACKGROUND OF THE INVENTION

Communication systems typically include a plurality of communication devices, such as mobile or portable radio units, dispatch consoles and base stations (sometimes called base site repeaters) that are geographically distributed among various base sites and console sites. The radio units wirelessly communicate with the base stations and each other using radio frequency (RF) communication resources, and are often logically divided into various subgroups or talkgroups. Communication systems are often organized as trunked systems, where the RF communication resources are allocated on a call-by-call basis among multiple users or groups. Wide-area trunked systems are sometimes organized into a plurality of "zones," wherein each zone includes multiple sites and a central controller or server ("zone controller") for allocating communication resources among the multiple sites.

Next generation communication systems have begun to use Internet Protocol (IP) to transport packet data representative of voice, video, data or control traffic between endpoints (or "hosts" in IP terminology). In such systems, host devices, including base stations, consoles, zone controllers, and in some instances, wireless mobile or portable radio units in different zones, are logically interconnected by various routers forming an IP network. Data is divided into IP packets called datagrams, which include addressing information (e.g., source and destination addresses) that enables the routers of the network to transport the packets to the specified destination(s). The destination addresses may identify a particular host or may comprise an IP Multicast address shared by a group of hosts. Examples of communication systems using multicast addressing are described and claimed in U.S. Pat. No. 6,141,347, titled "Wireless Communication System Incorporating Multicast Addressing and Method for Use" and U.S. patent application Ser. No. 09/464,269, titled "Methods for Implementing a Talkgroup Call in a Multicast IP Network," each of which is assigned to the assignee of the present invention and incorporated herein by reference in its entirety.

One of the underlying choices faced by IP multicast communication systems designers is that of which IP multicast routing protocol to use. Presently, there are two fundamental types of IP multicast routing protocols, commonly referred to as sparse mode and dense mode. Generally, in sparse mode, packets are communicated along a pre-established tree of router interfaces only to endpoints that have joined the multicast group address and hence, the sparse mode protocol is considered to provide an economical use of bandwidth and scale well for wide-area systems. In dense mode, the routers of the network employ a "flood-and-prune" operation whereby packets of a communication are initially distributed (or flooded) on all paths of the network. The distribution tree is then scaled back (or pruned) to eliminate unnecessary paths. Heretofore, the flood-and-prune approach of dense mode protocols was considered bandwidth wasteful and problematic in terms of scalability for wireless IP multicast communication systems, where participating radio units may roam between multiple sites and zones. However, dense mode protocols are known to exhibit improved join latency and decreased end-to-end delay relative to sparse mode. It would therefore be desirable to provide methods to limit the scope of flooding exhibited in dense mode IP multicast calls so as to make dense mode protocols an attractive alternative for wireless IP multicast communication systems. Advantageously, the method will provide for adjusting the scope of multicast group calls based on user location, as wireless users may roam from site to site or zone to zone. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
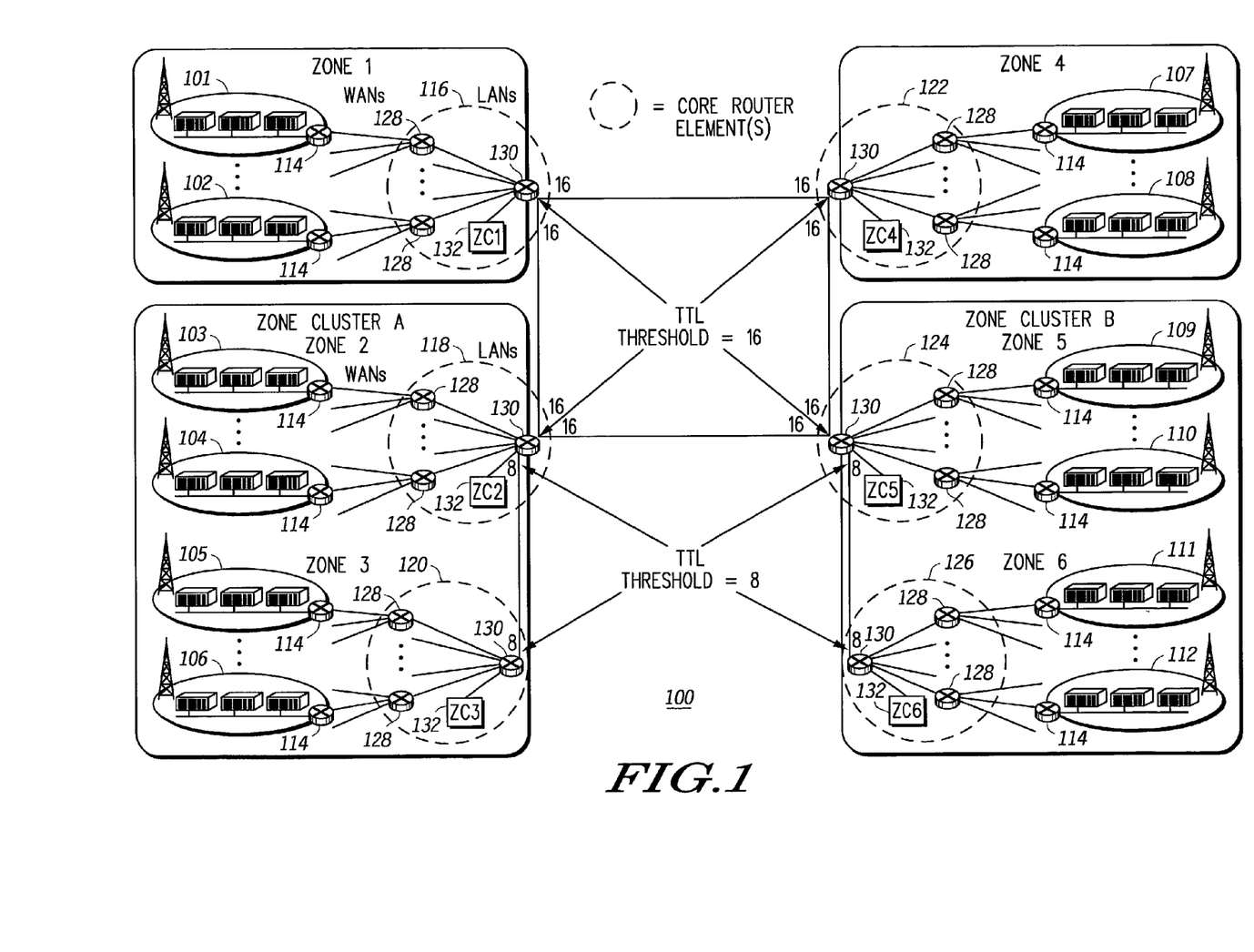
FIG. 1 shows a typical wide-area IP multicast communication system topology adapted for dense mode call scoping according to the present invention.

FIG. 1 shows by way of example and not limitation, an IP multicast communication system (or network) 100 comprising a plurality of base sites 101–112 organized into a plurality of zones ("Zone 1" through "Zone 6"). Regions that include multiple zones which, optionally, include infrastructure equipment housed within the same physical building (known as a Mobile Switching Office or "MSO") are referred to as "zone clusters." As shown, Zones 2 and 3 are denoted "Zone Cluster A" and Zones 5 and 6 are denoted "Zone Cluster B."

The base sites 101–112 communicate, via wireless communication resources, with communication units (not shown) which may comprise mobile or portable wireless radio units within their respective coverage areas. The communication units may be arranged into talk groups as known in the art. Suitable wireless communication resources are multiple RF (radio frequency) channels such as pairs of frequency carriers, time division multiple access (TDMA) slots, code division multiple access (CDMA) channels, wireless LAN, or any other RF transmission media.

The base sites 101–112 are logically coupled, via site routers 114 and respective WAN links to various core router elements 116–126. The core router elements 116–126 are also connected by WAN links. The core router elements 116–126 are functional elements that may be embodied in separate physical routers or combinations of routers. In the embodiment of FIG. 1, the core router elements 116–126 each comprise a "ring of routers" (denoted by dashed circles) made up of core edge routers 128 and core routers 130 interconnected by LAN links (i.e., multiple-access links). For convenience, the core router elements will hereinafter be referred to as rings 116–126. The core routers 130 are logically connected to respective zone controllers ("ZC") 132 having a processor (such as a microprocessor, microcontroller, digital signal processor or combination of such devices) and a memory (such as volatile or non-volatile digital storage devices or combination of such devices). The functions of the zone controller(s) 132 will be described in greater detail in relation to FIG. 2.

The core routers 130 of each ring 116–126 include interfaces, also known as "ports" that are linked to the core edge routers 128 of their associated ring and to core routers 130 of other rings 116–126 which, generally, may comprise rings in the same zone cluster or rings in remote zones or zone clusters. In one embodiment, packets are distributed between zones (or zone clusters) via the router interfaces or ports using dense mode routing protocols such as the Distance Vector Multicast Routing Protocol (DVMRP), Protocol Independent Multicast Dense Mode (PIM-DM) or the Multicast Open Shortest Path First (MOSPF) protocol. However, it is contemplated that alternative dense mode protocols, including those devised in the future may also be used to implement the present invention. In one embodiment, the router interfaces are programmed with TTL (Time to Live) thresholds that may be used to constrain the flooding of packets in dense mode as will be explained in greater detail in relation to the FIGS. 2–7. The TTL thresholds are typically programmed into the core routers 130 upon initial configuration of the network 100 based on the topology of the network and perhaps user distribution. In the embodiment of FIG. 1, for example, interfaces leading to rings within the same cluster are assigned a TTL threshold of 8 and interfaces leading to rings in remote zones or clusters are assigned a TTL value of 16.

Figure 2:
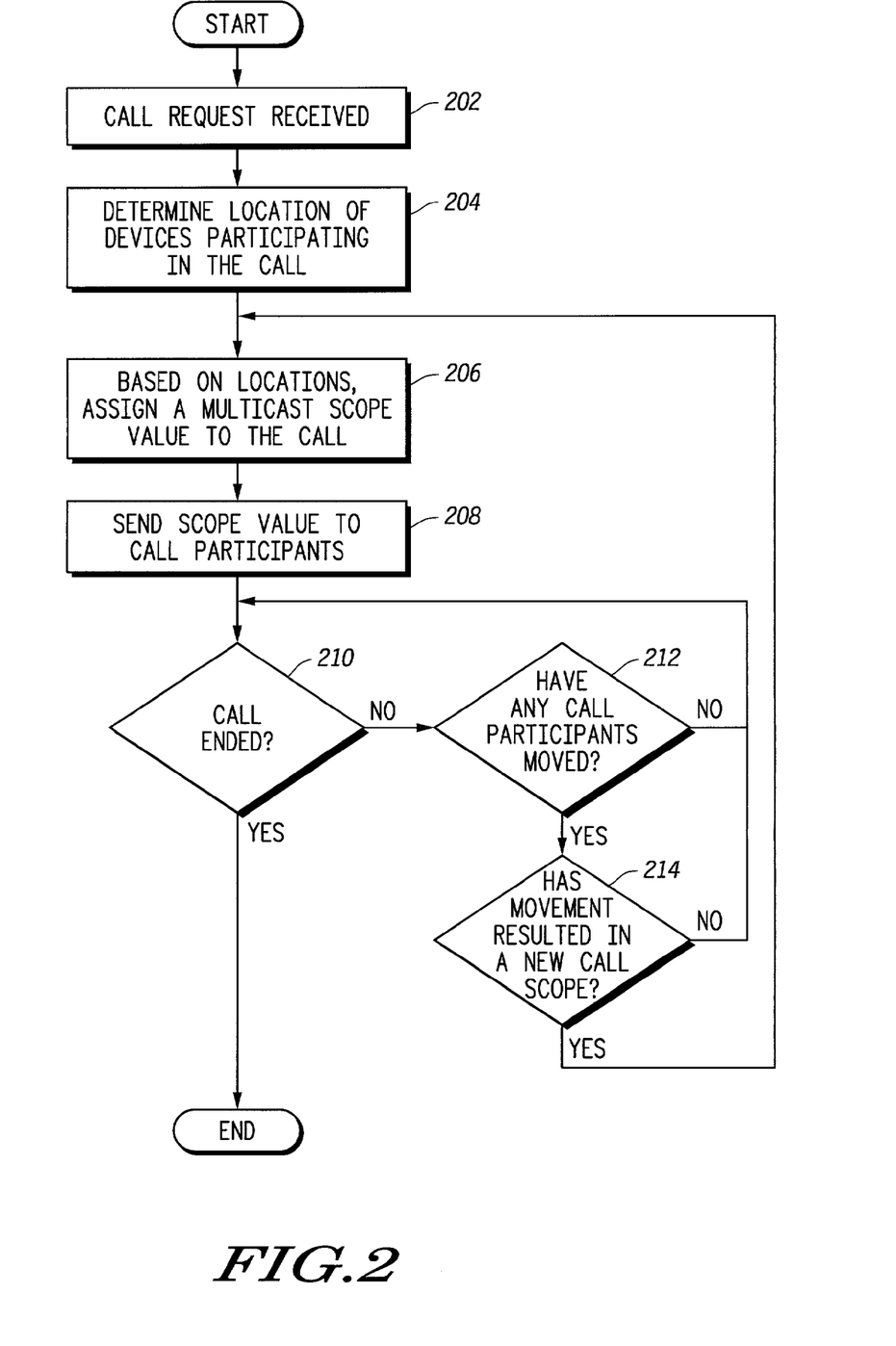
FIG. 2 is a flowchart illustrating a call scoping procedure for a dense mode multicast call, including steps performed by a zone controller according to one embodiment of the invention.

Referring now to FIG. 2, there is shown a method for a zone controller 132 to control the scope of flooding of a dense mode multicast call. The call may comprise, for example, a talkgroup call, private call, telephone interconnect call or generally any call that may be routed using IP multicast dense mode routing protocols. In one embodiment, the steps of FIG. 2 are implemented, where applicable, using stored software routines within a controlling zone controller 132 of the network 100. The controlling zone controller may be statically configured or alternatively, may be dynamically assigned on a call by call basis as the zone controller that is in the zone of the sourcing communication unit. That is, in the latter case, the controlling zone controller 132 would be in Zone 1 for a call sourced from within the coverage area of base site 101 (zone 1). The method of FIG. 2 presumes that the zone controller 132 is familiar with the topology of the network 100 and particularly, the TTL thresholds programmed into the core routers 130.

At step 202, the zone controller 132 receives a call request from a communication source. The communication source may comprise, for example, a wireless communication device, such as a mobile or portable radio, wireline communication device, console (wireless or wireline), base station, site controller, comparator, telephone interconnect device, internet protocol telephony device or generally any source of payload that may exist at any site, zone or zone cluster in the network 100.

Upon receiving the call request, the zone controller 132 determines at step 204 the location of devices that are to participate in the call. The participating devices may comprise, for example, communication devices associated with a particular talkgroup. In one embodiment, the zone controller 132 determines the location of participating devices using mobility management database, such as a home location register/visitor location register (HLR/VLR), as is known in the art.

Based on the location(s) of the participating devices, the zone controller 132 assigns at step 206 a multicast scope value to the call. The scope value may comprise, for example, a TTL (Time To Live) value or a "hop limit" value, that is to be included in the IP header of packets sourced for the call. The zone controller sends the multicast scope value to participating devices at step 208. Optionally, steps 206 and 208 may be accomplished in conjunction with the zone controller assigning and distributing a multicast group address for the call, which is described in the earlier-referenced patent application Ser. No. 09/464,269 and does not form a part of the present invention. In one embodiment, step 208 comprises sending a call grant message that includes the multicast scope value (and optionally, the multicast group address) to the participating devices. As will be appreciated, however, the scope value and/or multicast group address may be distributed in messages other than call grant messages.

Generally, the zone controller 132 assigns TTL or hop limit scope values to calls according to the extent it desires to constrain routing of associated packets within the network 100. As will become more apparent in relation to FIGS. 4–7, the multicast scope value enables the zone controller 132 to constrain the routing of packets to within a single zone, within a zone cluster, or to allow packets to be distributed to remote zones or zone clusters. In one embodiment, when the communication source transmits a payload message (e.g., voice, data, video, etc.), it is formed into packets with IP headers containing a TTL scope field. The packets flow through the network 100 until they hit router interface(s) with TTL thresholds that exceed the TTL scope. In this manner, the assignment of TTL scope can be used to constrain the dense mode routing of the packets. Thus, for example, in the system of FIG. 1, the zone controller may assign an IP scope of less than 8 to packets that it desires to constrain within a single zone (i.e., where the participating devices are within a single zone), an IP scope greater than 8 but less than 16 to packets that it desires to constrain with a zone cluster (i.e., where the participating devices are in multiple zones but within a zone cluster), or an IP scope greater than 16 to packets that it desires to distribute to remote zones or zone clusters (i.e., where the participating zones are located in remote zones or zone clusters).

If the zone controller 132 determines that the call has ended at step 210, the call scoping process ends. Otherwise, if the call has not ended, the zone controller 132 continues to monitor the location of participating devices to determine if any participants have moved. If participants have moved, the zone controller determines at step 214 whether a new call scope is needed or desired as a result of movement of the participating devices. For example, wireless users may move to different sites, zones or zone clusters during the call. In such case, the zone controller may desire to increase the scope of the call (i.e., to include additional zones or zone clusters) or decrease the scope of the call (i.e., to remove zones or zone clusters that no longer have participating devices). If a new call scope is not needed or desired at step 214, or if no participants have moved at step 212, the process returns to step 210. If the zone controller 132 determines that a new call scope is needed or desired at step 214, the process returns to step 206 for the zone controller to assign a new scope value, and so forth.

Figure 3:
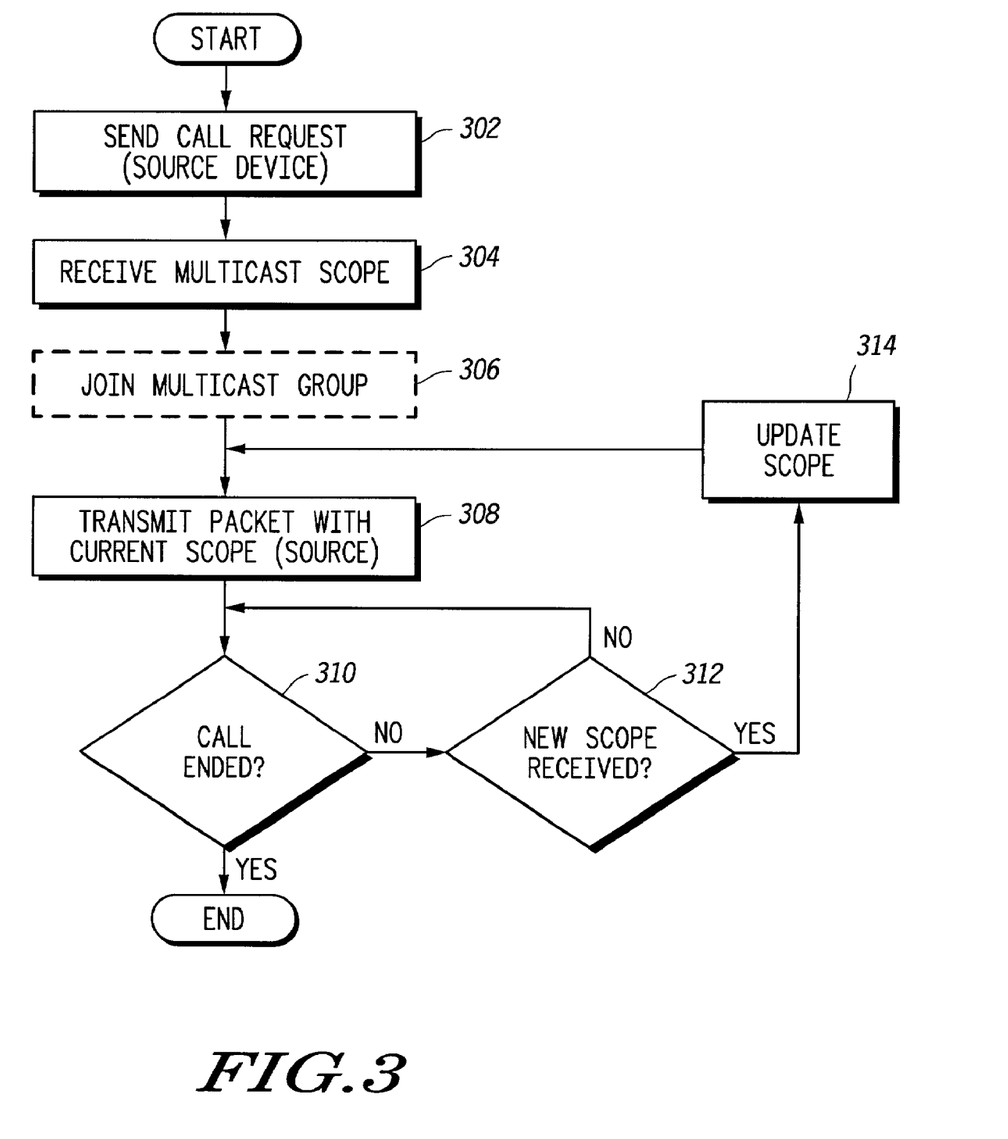
FIG. 3 is a flowchart showing the implementation of a dense mode multicast call using call scoping, including steps performed by participating devices according to one embodiment of the invention.

FIG. 3 is a flowchart showing steps performed by participating devices implementing a dense mode multicast call according to one embodiment of the invention. In one embodiment, the participating devices comprise sources and/or recipients of packet data addressed to a particular multicast group address. As will be appreciated, any IP host device including, but not limited to, repeater/base station(s), console(s), router(s), site controller(s), comparator/voter(s), scanner(s), site controller(s), telephone interconnect device(s) or internet protocol telephony device(s) may be a source or recipient of packet data. Recent advances in technology have also extended IP host functionality to wireless communication units, in which case the wireless communication units may also comprise sourcing or receiving hosts as defined herein. The steps of FIG. 3 are implemented, where applicable, using stored software routines within the sourcing and/or receiving hosts.

At step 302, the source sends a call request to the controlling zone controller. If the call request is granted, participating devices receive a multicast scope value (e.g., TTL scope) associated with the call at step 304. In one embodiment, the multicast scope value is received via a call grant message that also includes a multicast group address for the call. As will be appreciated, the call scope is distributed to recipient devices as well as the source device, because it is contemplated that the recipient device(s) may also desire to source messages addressed to the multicast group. The participating devices join the multicast group address at step 306, in one embodiment by sending IGMP Join messages to their site router(s). The site routers forward the Join message to the core edge router(s) 128. Alternatively, a proxy device built into the routers 128 could initiate Join messages on behalf of attached hosts at the site. The core edge router(s) maintain a list of group membership reports for each interface. It is noted that according to IGMP protocols, sourcing host devices may send IP datagrams addressed to a particular multicast group address without joining that address. Thus, step 306 is optional because it is not necessary for source devices to join a particular multicast group address unless they desire to receive IP datagrams addressed to that address. Nevertheless, it is contemplated that both source and destination devices will join the multicast group address because source devices (and also recipient devices) may desire to both source and receive messages on the multicast group address.

At step 308, the sending device sources payload for the call, which is formed into packets containing the TTL scope (or hop limit) field as assigned and routed through the network 100. In one embodiment, the TTL scope field is decremented by the downstream router(s) as it passes through the network 100. In the case where the sending device comprises a wireless communication unit that is not an IP host device, the forming of the message into IP packets containing the TTL scope field may be performed by the base station(s) receiving the message from the wireless communication unit or other appropriate downstream host device. According to dense mode protocols, the packets are distributed using a "flood-and-prune" approach whereby packets are initially flooded to all areas of the network and then, if some branches of the network do not have group members, those branches are pruned or eliminated from the distribution tree. Exceptions to the flooding are that packets are not flooded down links in which IGMP forwarding (or an IGMP proxy function) is enabled; and packets are not forwarded beyond their TTL scope. Pruning occurs, if at all, upon the packets being flooded to edge routers associated with sites that do not have participating members. If that occurs, those router(s) generate a Prune message toward the source, causing upstream routers to prune the interface(s) on which they received the Prune message. The Prune message(s) are transmitted hop by hop towards the transmitting source until the Prune hits the source's edge router or hits a router associated with a site that has participating members.

If a host leaves a multicast group, it sends an IGMP Leave message to its edge router. If no other group members exist at the site, the edge router deletes the group from its forwarding table. If an edge router has a previously pruned state, the router can graft a new branch when a member does appear at the site (e.g., upon a mobile wireless unit roaming to the site). When a router receives an IGMP report for a multicast branch that is in a pruned state, the router generates a graft message and sends it upstream to add the branch back. The graft is sent hop by hop until it reaches a "live" branch on the delivery tree.

If the call has ended (step 310), the participating devices leave the multicast group, in one embodiment by sending Leave messages to their associated site routers 114, and the process ends. Otherwise, if the call has not ended, the participating device(s) continue to monitor control messages from the zone controller to determine if the zone controller has updated the scope of the call. If a new call scope is not received at step 312, the process returns to step 308. If a new call scope is received at step 312, the participating device(s) update (i.e., increase or decrease) the call scope at step 314 and the process returns to step 308.

Now turning to FIGS. 4–7, there will be shown example call scenarios using dense mode multicast call scoping according to the present invention. The examples presume a network 100 of the type shown in FIG. 1 using IGMP forwarding on the links between site routers 114 and core edge routers 128; and PIM-DM multicast routing downstream from the core edge routers 128 with inter-zone, inter-cluster links assigned a TTL threshold of 16 and intra-cluster links assigned a TTL threshold of 8. Intra-zone links have no assigned TTL threshold. The examples use the term "sourcing site" to refer to the site of a communication unit that is or will be sourcing payload for a call and the term "participating site(s)" to refer to site(s) including communication units that are or will be receiving payload for the call. The communication unit(s) at the sourcing site and/or participating site(s) have affiliated with a talkgroup (or private call, telephone interconnect, etc.) and may or may not be IP host devices.

Additionally, it is presumed that when a site transmits IP packets addressed to a particular multicast group, the packets are sent over the site link from the site router 114 to the site's core edge router 128. The core edge router 128 floods the packets to all its interfaces except: 1) the interface it received the packet on; and 2) IGMP forwarded interfaces (i.e., the site links). Thus, given a network topology of the type shown, the core edge router(s) 128 will flood packets on one link only-the link to the core router 130. The core router 130 then floods the packets to all its interfaces that have TTL thresholds less than the TTL scope indicated in the IP packet header. The amount of flooding can be controlled through appropriate assignment of TTL scope, as best observed in the scenarios that follow.

Figure 4:
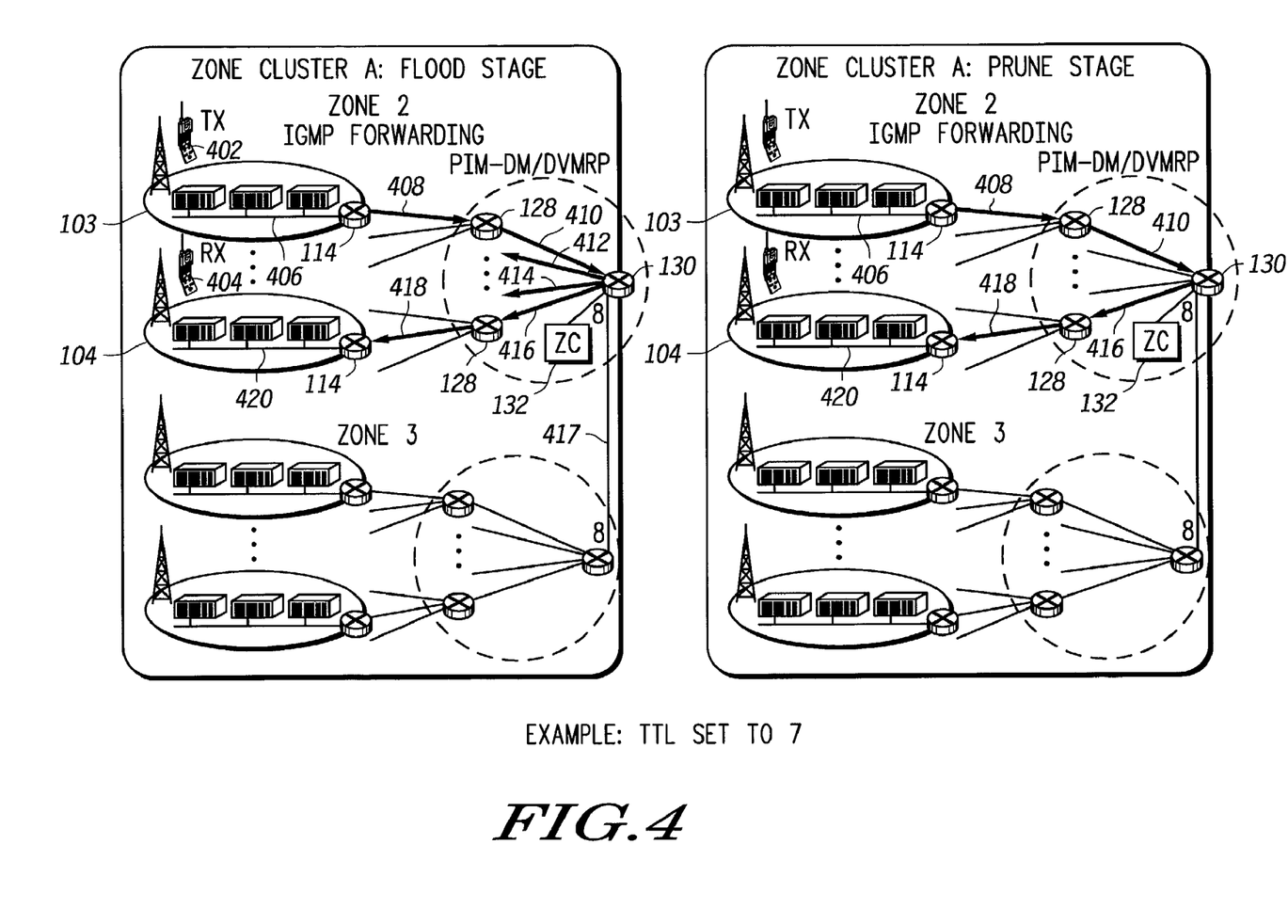
FIG. 4 illustrates the flood and prune stages of a call scenario utilizing dense mode multicast call scoping constrained to a single zone according to one embodiment of the present invention.

FIG. 4 shows a call scenario with communication units 402, 404 located within a single zone (i.e., Zone 2). The communication unit 402 (at site 103) will be a source of payload for the call and the communication unit 404 (at site 104) will be a recipient of the payload. Upon receiving a call request from the communication unit 402, the sourcing site 103 sends a group call request (not shown) to the zone controller 132. The zone controller 132 assigns an IP multicast address and a TTL value for the call and sends this information to the participating base sites 103, 104. The TTL value is selected according to a desired scope for the call and, in one embodiment, is decremented by one every "hop" or link between routers. Generally, if the zone controller desires to constrain packets to within a single zone ("an intra-zone call"), it assigns a TTL value that, when decremented, will be less than the TTL threshold of the core router of that zone. In the present example, the zone controller may assign a TTL value of less than 10 (e.g., 7) to constrain the scope of the call to Zone 2.

In one embodiment, the participating sites 103, 104 send IGMP "Join" messages to their associated site routers 114 to signify their desire to join the IP multicast group address. Upon receiving the "Join" messages, the site routers 114 forward the IGMP Join messages to their associated core edge routers 128. The core edge router(s) 128 maintain a list of group membership reports for each interface but do not propagate the IGMP join messages to downstream routers. When the communication unit 402 begins sourcing payload (e.g., audio, video, data, etc.) for the call, the site 103 encapsulates the payload into IP packets with the assigned TTL value (e.g., 7) and transmits the packets to the assigned IP multicast address.

Referring first to the left side (flood stage) of FIG. 4, the packets are transmitted on site link 406 to the site router 114, then across link 408 from the site router 114 to the core edge router 128 associated with the sourcing site 103. The core edge router 128 floods the packets on link 410 to the core router 130 (Zone 2). In the present example the TTL value at the core router 130 is 5 (i.e., 7−1(decrement by router 114)−1 (decrement by router 128)). When the packets reach the core router 130, it decrements the scope value and floods the packets to all its interfaces except those that have TTL thresholds greater than the TTL value (e.g., 4) presently indicated in the IP packet header. In the present example, the core router floods the packets via links 412, 414, 416 to other core edge routers in Zone 2 (having no assigned TTL threshold) but not across the intra-cluster link 417 to Zone 3 (having a TTL threshold of 8) or to any inter-cluster links or inter-zone links outside of Zone Cluster A (having a TTL threshold of 16, shown in FIG. 1).

Upon receiving the multicast packets, the core edge routers 128 check their IGMP group membership databases to determine whether any participating sites have joined the multicast group. Any core edge router(s) 128 having an associated site joined to the multicast group forward the packets to the appropriate site router 114. In the present example, the core edge router 128 associated with site 104 (having joined the multicast group) forwards the packets on site link 418 to the associated site router 114. The site router 114, in turn, forwards the packets to the participating base site 104 via site link 420. The base site 104 may then reformat the payload information, if necessary, and communicate the payload information to the recipient communication unit 104 via RF resources.

Core edge router(s) that do not have sites joined to the multicast group do not forward the packets but rather send prune message(s) (not shown) to the core router 130. Upon receiving a prune, the core router 130 will delete the interface from its forwarding table. In the present example, as best observed by comparing the left side (flood stage) to the right side (prune stage) of FIG. 4, the core router 130 has deleted the interface to links 412, 414, thereby "pruning" the distribution tree to extend only from site 103 to site 104. The final distribution tree is therefore set up as shown in the FIG. 4 "prune stage."

If, in the present example, additional communication unit(s) (not shown) roam to site(s) within Zone 2 that is not presently participating in the call, the communication unit(s) affiliate with the site(s) as known in the art. The zone controller 132 will instruct the new site(s) to join the multicast group and inform the site of the TTL scope. In the present example, the zone controller may use the same call scope (e.g., 7) as presently assigned to sites 103, 104 because the call scope was determined for a single-zone (zone 2) call and the new site(s) are also within zone 2. The new site(s) generate IGMP Join message(s) indicating their desire to join the multicast group and forward the messages to their base site router(s), which forward the message to the appropriate core edge router(s). If the core edge router(s) are already receiving the multicast packets for another participating site, they simply add the new site(s) to their list of outgoing interface links for the multicast group. If the core edge router(s) have previously pruned the link(s) to the newly added site(s), they convert the IGMP report(s) to multicast Graft message(s) (similar to Joins) and transmit them toward the multicast source. Upon receiving the graft(s), the core router replies with a Graft Acknowledgement message and adds the core edge router(s) to its outgoing interface list for the multicast group. If the core router is receiving multicast packets it will begin forwarding the packets to the core edge router(s) which, in turn, will forward the packets to the newly added site(s).

Figure 5:
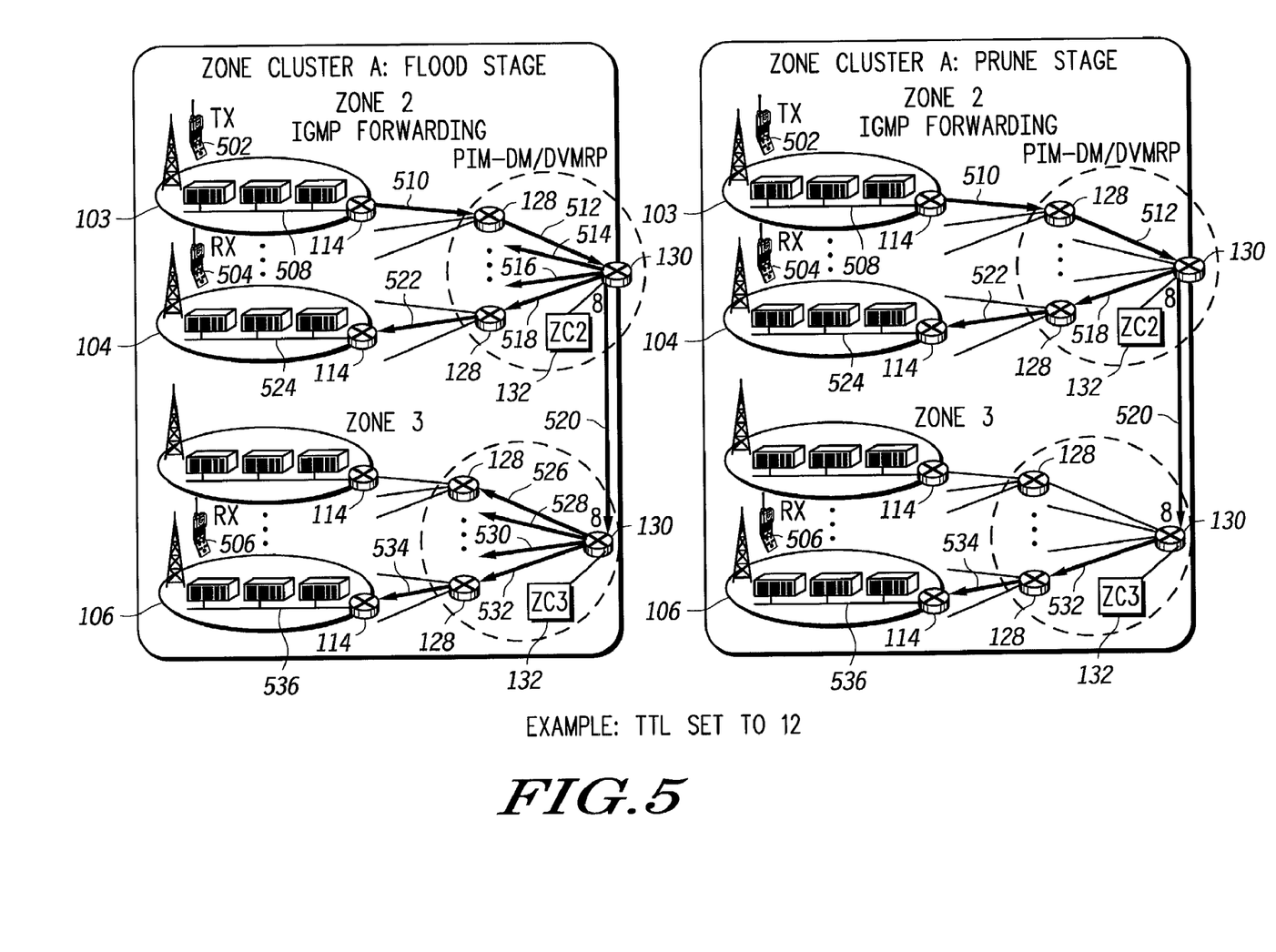
FIG. 5 illustrates the flood and prune stages of a call scenario utilizing dense mode multicast call scoping constrained to a region including multiple zones (referred to as a zone cluster) according to principles of the present invention.

Referring now to FIG. 5, there will be shown a call scenario with communication units 502, 504, 506 distributed among multiple zones (e.g., Zones 2 and 3) but within a single zone cluster (Zone Cluster A). The communication unit 502 (at site 103) will be a source of payload for the call and the communication units 504 (at site 104) and 506 (at site 106) will be recipients of the payload. Upon receiving a call request from the communication unit 502, the sourcing site 103 in Zone 2 sends a group call request (not shown) to its zone controller ("ZC2"). If the zone controller ZC2 is not the controlling zone controller for the call, it forwards the call request to the designated controlling zone controller. For convenience, it will be presumed that the zone controller ("ZC3") of zone 3 is the controlling zone controller for the call.

Upon receiving the call request, the controlling zone controller ZC3 determines which zones must participate in the call and sends a new call query (not shown) to each participating zone controller (ZC2 in the present example). ZC2 and participating sites within zone 3 respond to the new call query by indicating whether the necessary resources are available to support the call. If the resources are indicated as available, the controlling zone controller ZC3 issues a call grant update (not shown) to the participating zone controller ZC2 identifying an IP multicast address and a TTL value for the call. ZC3 and ZC2 issue call grant messages to their participating sites including the IP multicast address and the TTL value. As described in relation to FIG. 4, the TTL value is selected according to a desired scope for the call and, in one embodiment, is decremented by one every "hop" or link between routers. Generally, if the zone controller desires to scope the call for an "intra-cluster" call, it assigns a TTL value that, when decremented, will be greater than the TTL threshold of interfaces leading within the same cluster (e.g., Zone Cluster "A") but less than TTL threshold(s) leading outside of the zone cluster. In the present example, the zone controller may assign a TTL value of less than 18 (e.g., 12) to constrain the scope of the call to Zone Cluster A.

The participating sites 103, 104, 106 send IGMP "Join" messages to their associated site routers 114 to signify their desire to join the IP multicast group address. Upon receiving the "Join" messages, the site routers 114 forward the IGMP Join messages to their associated core edge routers 128. The core edge router(s) 128 maintain a list of group membership reports for each interface but do not propagate the IGMP join messages to downstream routers. When the communication unit 502 begins sourcing payload (e.g., audio, video, data, etc.) for the call, the site 103 encapsulates the payload into IP packets with the assigned TTL value (e.g., 12) and transmits the packets to the assigned IP multicast address.

Referring first to the left side (flood stage) of FIG. 5, the packets are transmitted on site link 508 to the site router 114, then across link 510 from the site router 114 to the core edge router 128 associated with the sourcing site 103. The core edge router 128 floods the packets on link 512 to the core router 130 (Zone 2). In the present example the TTL value at the core router 130 is 10 (i.e., 12−1 (decrement by router 114)−1 (decrement by router 128)). The core router 130 in Zone 2 decrements the scope and floods the packets to all its interfaces except those that have TTL thresholds greater than the TTL value (e.g., 9) presently indicated in the IP packet header. In the present example, the core router floods the packets via links 514, 516, 518 to other core edge routers in Zone 2 (having no assigned TTL threshold) and across the intra-cluster link 520 to Zone 3 (having a TTL threshold of 8) but not to any inter-cluster links or inter-zone links (having a TTL threshold of 16, shown in FIG. 1). In other words, the flooding is limited to Zone Cluster A.

When the packets (now having a TTL value of 9) reach the core router 130 in Zone 3, it decrements the TTL value and floods the packets to all its interfaces via links 526, 528, 530, 532 to the core edge routers in Zone 3 (having no assigned TTL threshold). In the present example, the core router in zone 3 does not have any interfaces leading outside the zone cluster A. It is noted, however, that if it did, those interfaces would likely have TTL thresholds greater than 9 and thus packets would not be flooded across those interfaces.

Upon receiving the multicast packets, the core edge routers 128 in Zones 2 and 3 check their IGMP group membership databases to determine whether any participating sites have joined the multicast group. Any core edge router(s) 128 having an associated site joined to the multicast group forward the packets to the appropriate site router 114. In the present example, the core edge router 128 associated with site 104 forwards the packets on site link 522 to the associated site router 114; and the core edge router 128 associated with site 106 forwards the packets on site link 534 to the associated site router 114. The site routers 114, in turn, forward the packets to the participating base sites 104, 106 via respective site links 524, 536. The respective base sites 104, 106 may then reformat the payload information, if necessary, and communicate the payload information to the recipient communication units 504, 506 via RF resources.

Core edge router(s) that do not have sites joined to the multicast group do not forward the packets but rather send prune message(s) (not shown) to their associated core router 130, causing the core router(s) 130 to delete those interfaces from their forwarding tables. In the present example, as best observed by comparing the left side (flood stage) to the right side (prune stage) of FIG. 5, the core router 130 in zone 2 has deleted the interface to links 514, 516 thereby pruning the distribution tree within zone 2 to extend only from site 103 to site 104; and the core router 130 in zone 3 has deleted the interface to links 526, 528 and 530 thereby pruning the distribution tree within zone 3 to extend only to site 106. The final distribution tree is therefore set up as shown in the FIG. 5 "prune stage."

As will be appreciated, it is possible that a call that is initially a single zone call may become a multi-zone, intra-cluster call (FIG. 5). This may occur, for example, in the scenario of FIG. 4 if the communication unit 404 (initially in Zone 2) roams to a new site within Zone 3 that is not presently participating in the call, and the communication unit 404 affiliates with the new site as known in the art. The controlling zone controller ZC3 will instruct the new site to join the multicast group and inform the site of the TTL scope. Since the call started as a single zone call and has changed to a cluster call, the TTL scope must be changed to appropriate value (e.g., 15) for a cluster call. The controlling zone controller ZC3 must also inform other participating sites of the new TTL scope so that all subsequent packets are transmitted, for example, with a TTL value of 15 rather than 7. The new site generates an IGMP Join message indicating its desire to join the multicast group and forward the messages to its base site router(s) which, in turn, forwards the message to the appropriate core edge router in Zone 3. Since, in the present example, the core edge router in zone 3 has not yet seen multicast packets for this group (due to the former TTL scope confined within zone 2), it will not have a prune state. Therefore, no graft will be generated. Instead, the sourcing site 103 will begin transmitting multicast packets with the increased TTL, causing the IP packets to flow through all core routers within the cluster and propagate to the edge routers. It is noted that flooding will occur for the first time, in the part of the cluster (i.e., zone 3) that contains the newly added site.

Figure 6:
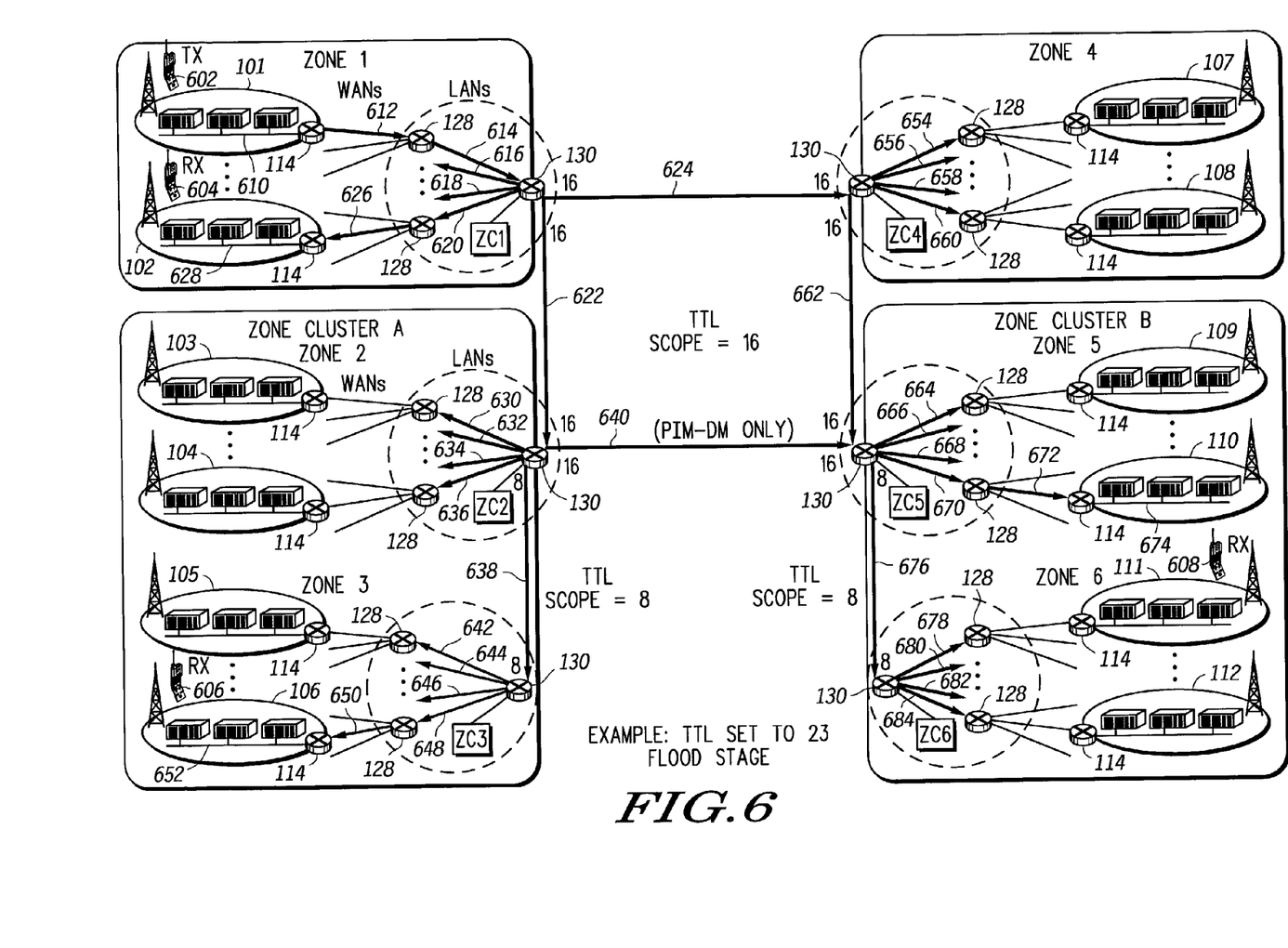
FIG. 6 illustrates the flood stage of a call scenario utilizing dense mode multicast call scoping that is not constrained to a particular zone or zone cluster according to principles of the present invention.
Figure 7:
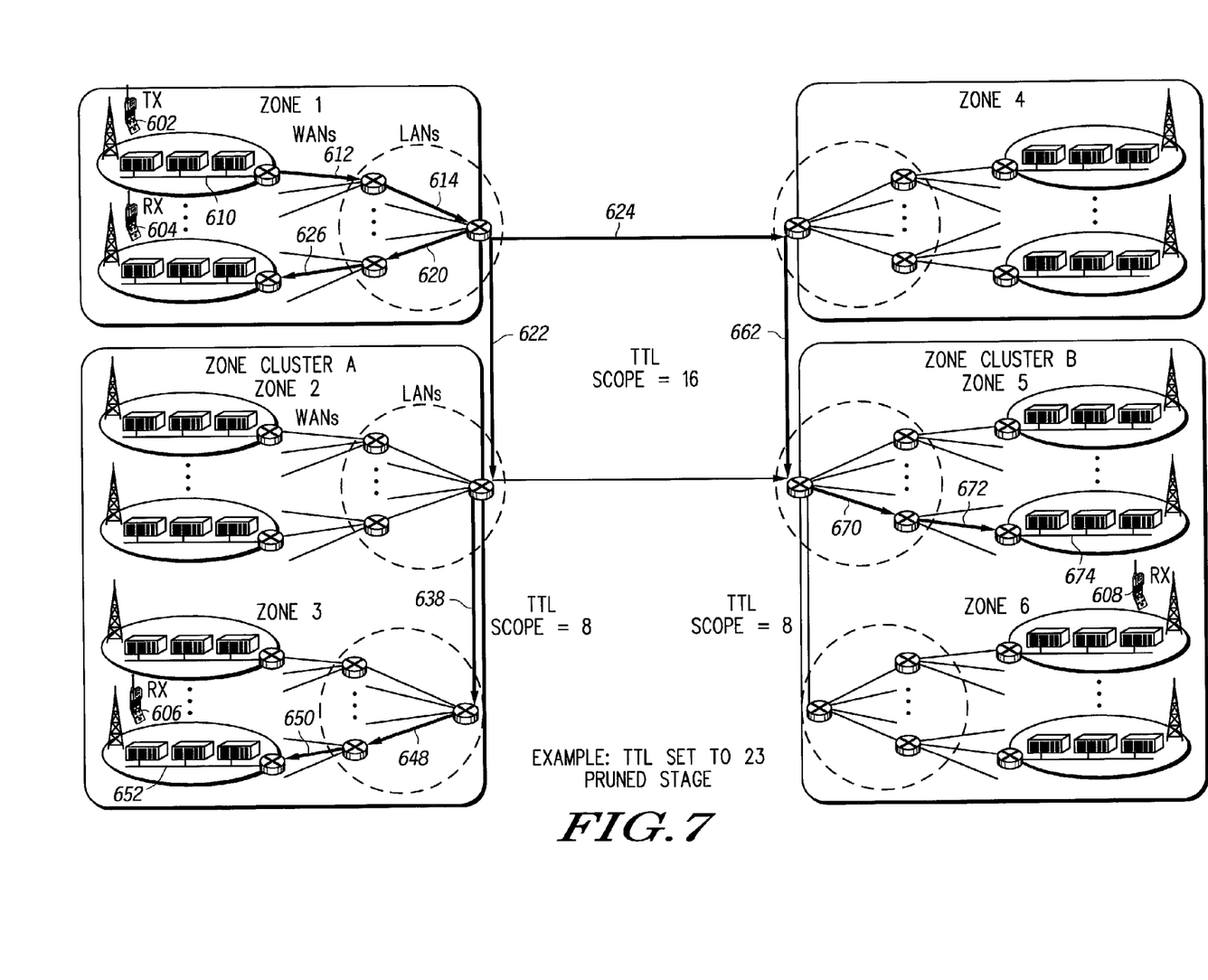
FIG. 7 illustrates the prune stage of the call scenario of FIG. 6.

Now turning to FIG. 6 and FIG. 7, there will be shown a call scenario with communication units 602, 604, 606, 608 distributed among multiple remote zones and zone clusters. The communication unit 602 (at site 101, zone 1) will be a source of payload for the call and the communication units 604 (at site 102, zone 1), 606 (at site 106, zone 3, zone cluster A), and 608 (at site 110, zone 5, zone cluster B) will be recipients of the payload. The scenario is very similar to the intra-cluster scenario described in relation to FIG. 5, except the controlling zone controller assigns a TTL scope (e.g., 23) of sufficient value that will allow packets to cross zone boundaries and cluster boundaries.

For purposes of brevity, the call scenario will be described only generally herein. In the flood stage (FIG. 6), packets are sent from the sourcing site 101 on link 610 to the site router 114, across link 612 to the core edge router 128 and on link 614 to the core router 130 (Zone 1). The TTL value at the core router 130 in Zone 1 is 21 (i.e., 23–2). The core router 130 in Zone 1 decrements the TTL value and floods the packets via links 616, 618, 620 to other core edge routers in Zone 1 (having no assigned TTL threshold) and via links 622, 624 to core routers in zones 2 and 4 (having a TTL threshold of 16). The core router in zone 2 decrements and floods the packets via links 630, 632, 634, 636 to core edge routers within zone 2 and, via link 638 to the core router in zone 3. The core router in zone 3, in turn, decrements and floods the packets via links 642, 644, 646, 648 to core edge routers within zone 3. In similar fashion, the core router in zone 4 decrements and floods the packets via links 654, 656, 658, 660 to core edge routers within zone 4 and, via link 662 to the core router in zone 5. The core router in zone 5 decrements and floods the packets via links 664, 666, 668, 670 to core edge routers within zone 5 and, via link 676 to the core router in zone 6. The core router in zone 6, in turn, decrements and floods the packets via links 678, 680, 682, 684 to core edge routers within zone 6.

Upon receiving the multicast packets, the core edge routers 128 in each zone check their IGMP group membership databases and either forward the packets to the appropriate site router 114 or send prune message(s) to their core router 130, causing the core router(s) 130 to delete those interfaces from their forwarding tables, as has been described in relation to FIG. 4 and FIG. 5. In the present example, as best observed by comparing FIG. 6 (flood stage) to FIG. 7 (prune stage), links 616, 618 in zone 1; links 630, 632, 634, 636 in zone 2; links 642, 644, 646 in zone 3; links 654, 656, 658, 660 in zone 4; links 664, 666, 668 in zone 5; and links 678, 680, 682, 684 in zone 6 have been pruned, resulting in the final distribution tree set up as shown in the FIG. 7 "prune stage."

As will be appreciated, the mobility scenario is also similar to the intra-cluster call described above. Any call that starts as a single zone or single cluster call may become a multi-zone, multi-cluster call due to mobility of one or more communication units, in which case the controlling zone controller must change the TTL scope to appropriate value (e.g., 23) for the multi-zone, multi-cluster call. Flooding will occur in zones that were formerly scoped out of the call.

The present disclosure therefore has identified methods for limiting dense mode multicast flooding based on user location within a single zone, zone cluster, or in multiple remote zones and/or zone clusters. The methods are adapted to accommodate wireless users roaming to different sites, zones or zone clusters during the duration of the call.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a wireless communication system comprising a plurality of communication devices and a plurality of sites organized into one or more zones, a method comprising:
   receiving a request for a call from a sourcing device of the plurality of devices, wherein the sourcing device comprises a sourcing site of the plurality of sites and is in a first zone of the communication system;
   determining locations of one or more participating devices for the call at one or more destination sites;
   based on the locations of the participating devices, assigning a first multicast scope value to the call;
   sending the first multicast scope value to the participating devices at the one or more destination sites;
   sending, from the sourcing site to a first router element, one or more IP packets including the multicast scope value and addressed to a multicast group address; and
   routing the IP packets by the first router element with a decremented multicast scope value, according to a dense mode routing protocol, across one or more router interfaces of the first router element to the one or more destination sites.

2. The method of claim 1, being accomplished by a controlling zone controller of the communication system.

3. The method of claim 1, further comprising:
   monitoring movements of the participating devices; and
   if any of the participating devices move to a new destination site, wherein the zone of the new destination site already includes another destination site, sending the first multicast scope value to the new destination site.

4. The method of claim 1, further comprising:
   monitoring movements of the participating devices; and
   if any of the participating devices move to a new destination site, wherein the zone of the new destination site does not already include another destination site, assigning a second multicast scope value for the call, and sending the second multicast scope value to one or more present destination sites.

5. The method of claim 1, further comprising:
   monitoring movements of the participating devices; and
   if any of the participating devices move from a destination site, defining a former destination site, and wherein the zone of the former destination site no longer includes any participating devices, assigning a second multicast scope value for the call, and sending the second multicast scope value to one or more present destination sites.

6. The method of claim 1, wherein the step of sending one or more IP packets comprises sending the packets via a path including a site router, a core edge router and a core router associated with the first zone, the decremented multicast scope value being determined by decrementing the first multicast scope value at each router in the path.

7. The method of claim 1, wherein the router interfaces comprise a number of outbound interfaces having respective TTL thresholds, and wherein the step of routing comprises flooding the IP packets from the first router element only on the outbound interfaces having TTL thresholds that do not exceed the decremented multicast scope value.

8. The method of claim 7, wherein the TTL thresholds comprise a first TTL threshold for outbound interfaces to zones within a zone cluster and a second TTL threshold for outbound interfaces to remote zones.

9. The method of claim 8, wherein the sourcing and destination sites are all within the first zone of the communication system, the step of assigning a first multicast scope value comprises assigning a value resulting in a decremented multicast scope value at the first router element that is less than the first TTL threshold.

10. The method of claim 8, wherein the sourcing and destination sites are distributed among multiple zones defining a zone cluster, the step of assigning a first multicast scope value comprises assigning a value resulting in a decremented multicast scope value at the first router element that is greater than the first TTL threshold and less than the second TTL threshold.

11. The method of claim 8, wherein the sourcing and destination sites are distributed among multiple remote zones, the step of assigning a first multicast scope value comprises assigning a value resulting in a decremented multicast scope value at the first router element that is greater than the second TTL threshold.

12. In a wireless communication system comprising a plurality of sites organized into one or more zones, a method comprising a sourcing host performing the steps of:
   sending a call request to a controller;
   receiving, from the controller, a multicast group address and a multicast scope value for the call;
   forming one or more IP packets including the multicast scope value;
   sending the one or more IP packets to the multicast group address;
   receiving, from the controller, an updated multicast scope value based on mobility of one or more participating devices during the call;
   forming one or more IP packets including the updated multicast scope value; and
   sending the one or more IP packets to the multicast group address.

13. The method of claim 12, further comprising the sourcing host joining the multicast group address.

* * * * *